United States Patent
Tapia et al.

(10) Patent No.: US 9,596,697 B2
(45) Date of Patent: Mar. 14, 2017

(54) APPLICATION CONTROLLER FOR QUALITY-OF-SERVICE CONFIGURATION OF A TELECOMMUNICATION DEVICE RADIO

(71) Applicant: T-Mobile USA, Inc., Bellevue, WA (US)

(72) Inventors: Pablo Tapia, Snoqualmie, WA (US); Mehul Shah, Sammamish, WA (US); Alexandru Catalin Ionescu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 162 days.

(21) Appl. No.: 13/839,035

(22) Filed: Mar. 15, 2013

(65) Prior Publication Data
US 2013/0258966 A1  Oct. 3, 2013

Related U.S. Application Data

(60) Provisional application No. 61/619,898, filed on Apr. 3, 2012.

(51) Int. Cl.
*H04W 72/08* (2009.01)
*H04L 12/859* (2013.01)
*H04L 12/851* (2013.01)
*H04W 76/02* (2009.01)
*H04L 12/801* (2013.01)

(52) U.S. Cl.
CPC ....... *H04W 72/087* (2013.01); *H04L 47/2441* (2013.01); *H04L 47/2475* (2013.01); *H04L 47/14* (2013.01); *H04W 76/022* (2013.01)

(58) Field of Classification Search
None
See application file for complete search history.

(56) References Cited

U.S. PATENT DOCUMENTS

| 2003/0229760 A1 | 12/2003 | Doyle et al. |
| 2005/0286488 A1 | 12/2005 | Briscoe et al. |
| 2006/0168303 A1 | 7/2006 | Oyama et al. |
| 2006/0225082 A1* | 10/2006 | Yao .................. G06F 9/547 719/328 |

(Continued)

FOREIGN PATENT DOCUMENTS

WO  WO2007121096 A1  10/2007

OTHER PUBLICATIONS

The PCT Search Report and Written Opinion mailed Mar. 12, 2013 for PCT application No. PCT/US12/68160, 8 pages.

(Continued)

*Primary Examiner* — Charles C Jiang
*Assistant Examiner* — George Atkins, Jr.
(74) *Attorney, Agent, or Firm* — Lee & Hayes, PLLC

(57) ABSTRACT

An application controller of a telecommunication device to determine, for a packet flow of an application, a quality-of-service rule associated with the application is described herein. The application controller then configures a data bearer for a wireless communication stack of the telecommunication device with a quality-of-service specified by the quality-of-service rule and provides a packet of the packet flow for transmission to a remote recipient via the configured data bearer.

19 Claims, 3 Drawing Sheets

(56) References Cited

U.S. PATENT DOCUMENTS

| | | | |
|---|---|---|---|
| 2006/0268716 A1* | 11/2006 | Wijting | H04L 12/5693 370/235 |
| 2008/0056286 A1* | 3/2008 | Forssell | H04L 12/5692 370/401 |
| 2008/0057894 A1 | 3/2008 | Aleksic et al. | |
| 2009/0222842 A1* | 9/2009 | Narayanan | G06F 9/542 719/328 |
| 2009/0231999 A1 | 9/2009 | Verma et al. | |
| 2010/0034083 A1 | 2/2010 | Prakash et al. | |
| 2011/0110333 A1 | 5/2011 | Chen | |
| 2011/0122885 A1* | 5/2011 | Hedman | H04L 65/1016 370/412 |
| 2011/0161484 A1* | 6/2011 | Van den Bogaert | H04L 43/0876 709/224 |
| 2011/0188457 A1 | 8/2011 | Shu et al. | |
| 2011/0191482 A1 | 8/2011 | Przybysz et al. | |
| 2011/0242979 A1 | 10/2011 | Feroz et al. | |
| 2012/0013748 A1 | 1/2012 | Stanwood et al. | |
| 2012/0069763 A1* | 3/2012 | Zhao | H04W 28/24 370/252 |
| 2012/0271958 A1 | 10/2012 | Oh | |
| 2013/0054784 A1 | 2/2013 | Yadav et al. | |
| 2013/0065551 A1 | 3/2013 | Raleigh et al. | |
| 2013/0102343 A1* | 4/2013 | Shaw | H04L 47/762 455/509 |
| 2013/0107706 A1* | 5/2013 | Raleigh | H04W 28/0268 370/230 |
| 2013/0114485 A1 | 5/2013 | Vannithamby et al. | |
| 2013/0121206 A1* | 5/2013 | Turanyi | H04L 47/782 370/254 |
| 2013/0166623 A1 | 6/2013 | Stanwood et al. | |
| 2013/0185586 A1 | 7/2013 | Vachharajani et al. | |
| 2013/0225094 A1 | 8/2013 | Mujtaba et al. | |
| 2013/0242726 A1 | 9/2013 | Zhu et al. | |
| 2013/0273876 A1* | 10/2013 | Rasanen | H04M 3/42153 455/404.1 |
| 2014/0036785 A1 | 2/2014 | Li et al. | |
| 2014/0136716 A1 | 5/2014 | Stevens et al. | |
| 2014/0153391 A1* | 6/2014 | Ludwig | H04L 41/0816 370/230 |
| 2015/0009826 A1* | 1/2015 | Ma | H04W 28/0268 370/235 |

OTHER PUBLICATIONS

The PCT Search Report and Written Opinion mailed Jul. 26, 2013 for PCT Application No. PCT/US13/35148, 11 pages.

Office action for U.S. Appl. No. 13/705,014, mailed on Jul. 7, 2014, Tapia et al., "Quality of Service Application Controller and User Equipment Application Profiler", 11 pages.

Office Action for U.S. Appl. No. 13/839,575, mailed on Nov. 17, 2014, Pablo Tapia, "Rule-Based Application Controller for Signaling Reduction", 20 pages.

Final Office Action for U.S. Appl. No. 13/839,575, mailed on Mar. 13, 2015, Pablo Tapia, "Rule-Based Application Controller for Signaling Reduction", 24 pages.

Office Action for U.S. Appl. No. 13/839,575, mailed on Jul. 1, 2015, Pablo Tapia, "Rule-Based Application Controller for Signaling Reduction", 24 pages.

Office action for U.S. Appl. No. 13/839,575, mailed on Dec. 16, 2015, Tapia et al., "Rule-Based Application Controller for Signaling Reduction", 22 pages.

* cited by examiner

APPLICATION CONTROLLER FOR QUALITY-OF-SERVICE CONFIGURATION OF A TELECOMMUNICATION DEVICE RADIO

RELATED APPLICATIONS

This application claims priority to U.S. provisional patent application No. 61/619,898, entitled "Wireless Application Controller" and filed on Apr. 3, 2012. Application No. 61/619,898 is fully incorporated herein by this reference.

BACKGROUND

Quality-of-service (QoS) provides a mechanism for controlling performance, reliability, and usability of telecommunication services by specifying parameters for a connection, such as priority and minimum bit rate. Typically, QoS is specified by a network operator for a communication connection with a telecommunication device, such as a video call, a voice call, a network browsing session, or a media streaming session. For example, the QoS for a video call may request a minimum reservation of downlink and uplink bandwidth.

QoS may specify how a given connection is handled on either or both of a telecommunication device or network devices. For example, a data bearer of a telecommunication device may be configured with a QoS to use in transmitting packets for a specific packet flow. Network devices, such as base stations, may also utilize the QoS in allocating spectrum and prioritizing packets for transmission.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
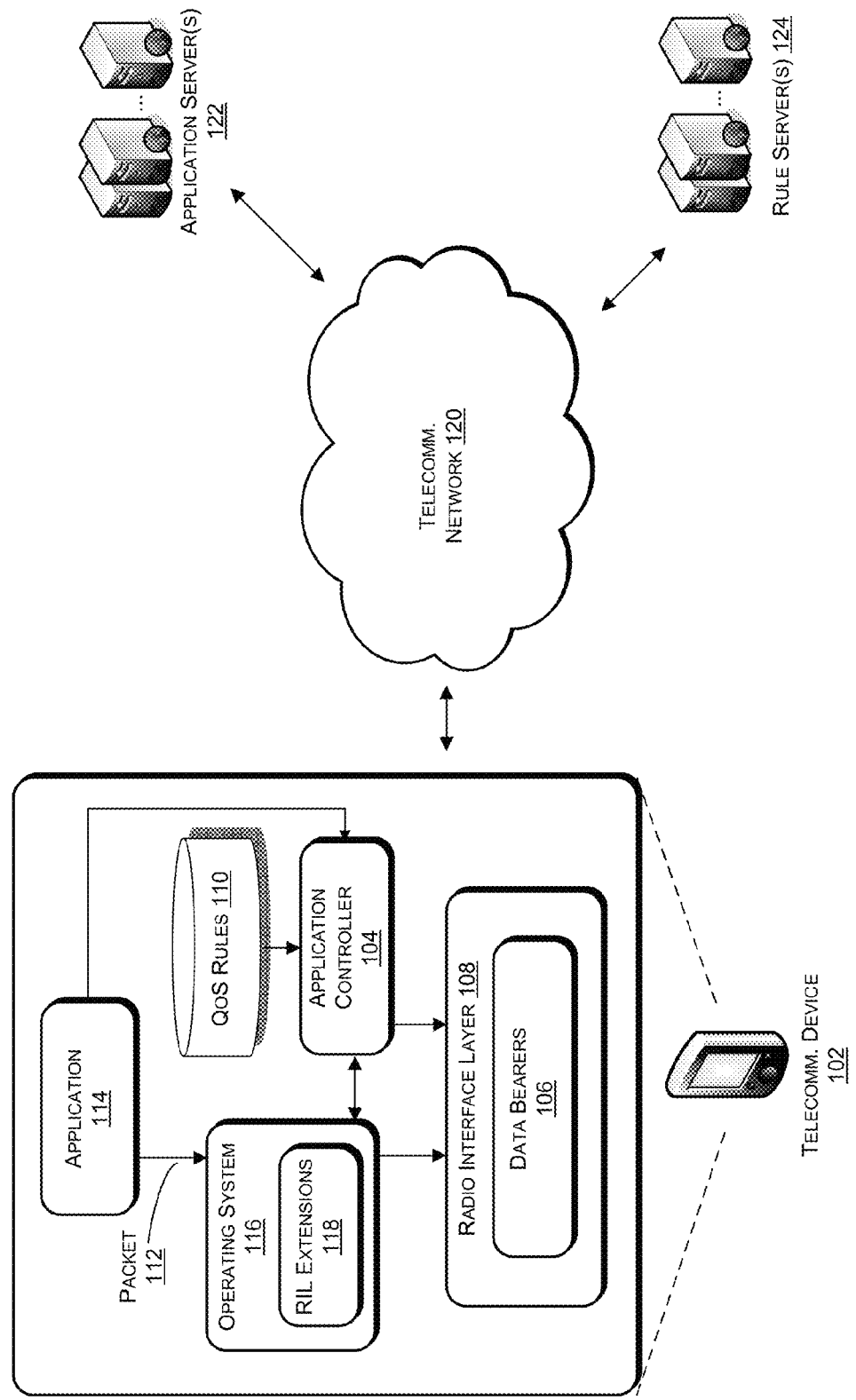
FIG. 1 illustrates an example environment including a telecommunication device configured with an application controller to utilize QoS rules in data bearer configuration, a telecommunication network, one or more application servers, and one or more QoS rule servers.

This disclosure describes, in part, an application controller of a telecommunication device that determines, for a packet flow of an application, a quality-of-service rule associated with the application. The application controller then configures a data bearer, such as a radio bearer, for a wireless communication stack of the telecommunication device, such as a Long Term Evolution (LTE) stack, with a quality-of-service specified by the quality-of-service rule and provides a packet of the packet flow for transmission to a remote recipient via the configured data bearer. The data bearer may be a Packet Data Protocol (PDP) Context when the telecommunication network is a Universal Mobile Telecommunications Systems (UMTS) network or an Evolved Packet System (EPS) bearer when the telecommunication network is a Long Term Evolution (LTE) network.

In various embodiments, the application controller may be part of one or more applications of the telecommunication device and may configure a data bearer at the radio interface layer (RIL) of the telecommunication device and access QoS functionality through a QoS application programming interface (API). Alternatively, the application controller may be part of the operating system of the telecommunication device, or may be a layer between the applications and operating system or between the operating system and RIL. In some embodiments, the operating system may further include RIL extensions to enable the application controller to communicate with and configure the RIL by, for example, creating or configuring data bearers.

The telecommunication device may receive or retrieve the QoS rules from a network operator or service provider. The QoS rules may be provided a single time, provided incrementally, or may be provided and then updated at intervals. The QoS rules may specify parameters for network connections, such as transmission priorities or minimum bit rates. If provided by the network operator, the network operator may take into account both telecommunication device conditions and network conditions in generating and updating the QoS rules. For example, the network operator may generate two different QoS rules for a same application, each rule associated with a different cell of the telecommunication network. QoS rules may also be associated with time periods (e.g., for the first n time units of a packet flow, use a first QoS, for the next m time units, use a second QoS).

In some embodiments, upon receiving a packet of a packet flow, the application controller determines an application identifier for the application associated with the packet flow. The application identifier may include one or more of an internet protocol (IP) address, a communication protocol, a source port, a destination port, an application name, a signature, or a website name. The application controller may then use the application identifier to retrieve one or more QoS rules for the application from the received/retrieved set of QoS rules.

Example Environment

FIG. 1 illustrates an example environment including a telecommunication device configured with an application controller to utilize QoS rules in data bearer configuration, a telecommunication network, one or more application servers, and one or more QoS rule servers. As illustrated, a telecommunication device 102 may be configured with an application controller 104. The application controller 104 may configure a data bearer 106 of a radio interface layer (RIL) 108 with a QoS specified by a QoS rule 110. The application controller 104 retrieves the QoS rule 110 from a set of QoS rules 110 responsive to receiving a packet 112 of a packet flow of an application 114. The retrieved QoS rule 110 is associated with the application 114. The telecommunication device 102 may further include an operating system 116, which may receive the packets 112 from applications 114 and provide them to the application controller 104. Further, the operating system 116 may include RIL extensions 118 to enable the application controller 104 to communicate with and configure the data bearer 106 of the RIL 108. Upon configuring the data bearer 106, the application controller 104 may provide the packet 112 to the data bearer 106 for transmission over a telecommunication network 120 to one or more application servers 122. Additionally, the telecommunication device 102 may receive QoS rules 110 and updates to QoS rules 110 from one or more rule servers 124 via the telecommunication network 120.

Figure 2:
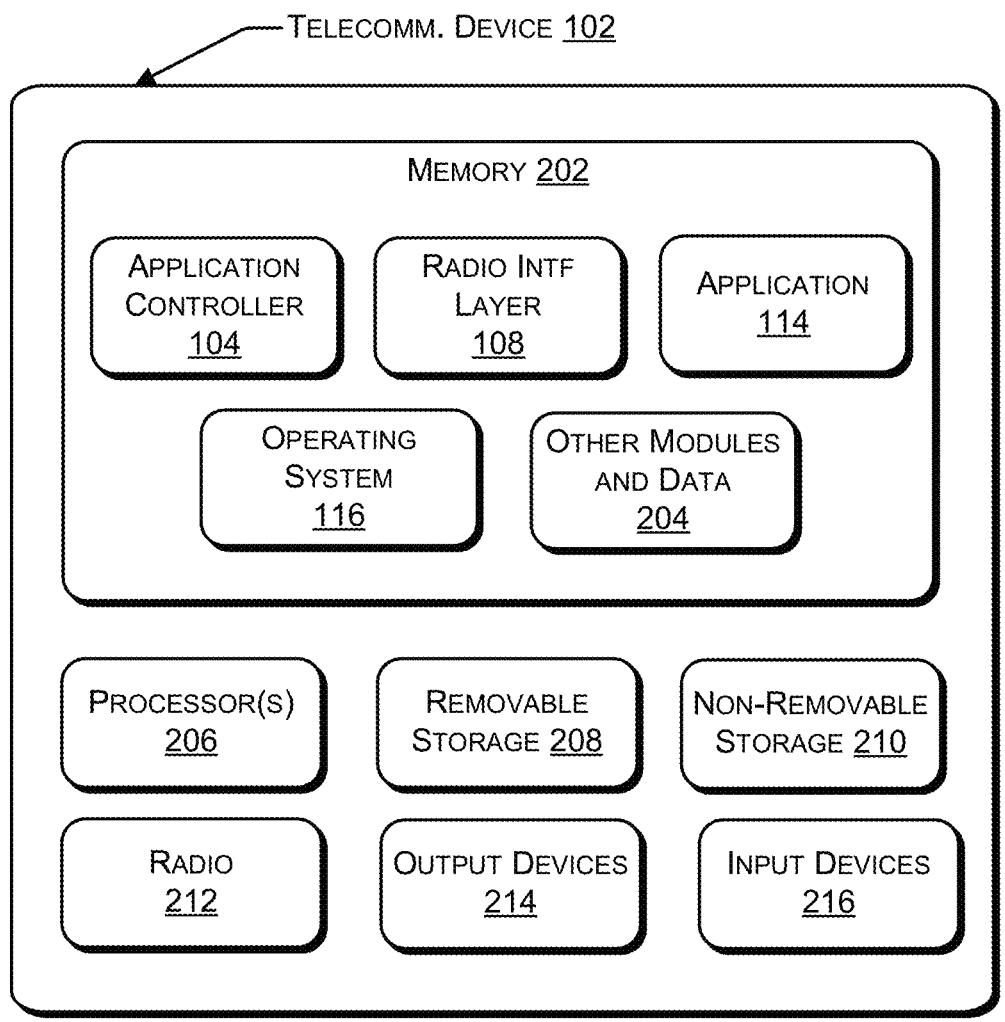
FIG. 2 illustrates a component level view of a telecommunication device equipped with the application controller.

In various embodiments, the telecommunication device 102, or user equipment (UE), may be any sort device capable of cellular or wireless network communication, such as a cellular phone, a tablet computer, a personal digital assistant (PDA), a personal computer (PC), a laptop computer, a media center, a work station, etc. The telecommunication device 102 may be associated with a subscription to telecommunication services of a network operator of the telecommunication network 120. An example telecommunication device 102 is illustrated in FIG. 2 and described below with reference to that figure.

The applications 114 may be any sort of network applications, such as video call clients, voice call clients, network browsers, social media clients, messaging clients, or media streaming clients. Such applications may send and receive both signaling and data in the form of packets, such as packets 112. These packets 112 may specify any or all of an IP address of a packet destination, a communication protocol, a source port of the telecommunication device 102, a destination port of the packet destination, an application name, a signature, or a website name. In some embodiments, the applications 114 may each include as a subcomponent an application controller 104. When the application controller 104 is a subcomponent of an application 114, either the application 114 or the operating system 116 may provide a QoS API to expose QoS configuration capabilities of the operating system 116 and RIL 108.

In some embodiments, the operating system 116 may be any sort of telecommunication device operating system, such as an iOS®, an Android® operating system, a Windows® operating system, or a Unix-based operating system. The operating system 116 may include capabilities that enable QoS configuration of data bearers 106 of the RIL 108 or, alternatively, RIL extensions 118 that provide such QoS configuration capabilities. The operating system 116 may also include the application controller 104 as, for example, a modification of a kernel of the operating system 116.

The RIL 108 may be an RIL of a network stack and may serve as an interface to a radio of the telecommunication device 102. The RIL 108 may support a number of data bearers 106 for different packet flows, applications 114, or categories of applications 114, each data bearer 106 associated with a set of connection parameters that may be described as a QoS. A data bearer 106 may be created with a specific QoS, such as a QoS specified by a QoS rule 110 or a default QoS, and may be updated with a different QoS. The wireless communication stack may communicate with the telecommunication network 120 to inform the telecommunication network 120 of a QoS specified for a packet flow or application 114. The data bearers 106 may further receive packets 112, either from the operating system 116 or from the application controller 104, and may transmit the packets over the telecommunication network 120 via the radio of the telecommunication device 102. The data bearers 106 may also receive inbound packets associated with their respective packet flows or applications 114 and may provide those inbound packets to the applications 114. The QoS configurations of the data bearers 106 may apply to either or both of inbound and outbound packet transmissions.

In various embodiments, the QoS rules 110 may be stored locally on the telecommunication device 102 or remotely. The QoS rules 110 may be stored in a database, file, collection, or other data structure. In one embodiment, they may be specified in an extensible markup language (XML) file. The telecommunication device 102 receives or retrieves the QoS rules 110 from a network operator or service provider. This network operator or service provider is illustrated in FIG. 1 by the one or more rules servers 124. The QoS rules 110 may be provided a single time, provided incrementally, or may be provided and then updated at intervals. The QoS rules 110 may specify parameters for network connections, such as transmission priorities or minimum bit rates. The rules server(s) 124 may take into account both telecommunication device conditions and network conditions in generating and updating the QoS rules 110. For example, the rules server(s) 124 may generate two different QoS rules 110 for a same application 114, each rule associated with a different cell of the telecommunication network 120. QoS rules 110 may also be associated with time periods (e.g., for the first n time units of a packet flow, use a first QoS, for the next m time units, use a second QoS). Further, the QoS rules 110 may be associated with a user subscription level, as the rules server(s) 124 may generate different sets of QoS rules for different subscription levels.

As mentioned above, the application controller 104 may be part of one of more applications 114 or part of the operating system 116. Alternatively, the application controller 104 may be a layer, such as a layer in a network stack. In such embodiments, that layer may be between the applications 114 and the operating system 116 or between the operating system 116 and RIL 108. Regardless of whether it is incorporate in the applications 114 or operating system 116 or is a layer, the application controller 104 is in the communication path from an application 114 to a data bearer 106.

In various embodiments, the application controller 104 receives or traps packets 112 provided by the applications 114 for transmission via the radio of the telecommunication device 102. Upon receiving a packet 112, the application controller 104 determines the application identifier of the packet 112 and determines whether a data bearer 106 has been configured for the packet flow or application 114 associated with that packet 112. If such a data bearer 106 has been configured, the application controller 104 provides the packet 112 to that data bearer 106 for transmission. If no data bearer 106 has been configured for the packet flow/application 114 associated with the packet 112, the application controller 104 utilizes the application identifier of the packet 112 to retrieve a QoS rule 110 from the set of QoS rules 110. To retrieve the QoS rule 110, the application controller 104 may utilize mappings of application identifiers to QoS rules 110 or mappings of application identifiers to categories and categories to QoS rules 110. As mentioned, the QoS rules 110 may be stored locally on the telecommunication device 102 or remotely at, for example, rules server(s) 124. In some embodiments, no QoS rule 110 may be associated with the application identifier of the packet 112. In such embodiments, the application controller 104 may utilize a default QoS to configure the data bearer 106.

The retrieved QoS rule 110 specifies a QoS, and the application controller 104 uses that QoS to configure a data bearer 106. Configuring a data bearer 106 may involve initiation of a new data bearer 106 or modification to the QoS parameters of an existing data bearer 106. In some embodiments, a QoS rule 110 may specify multiple QoSs to be selected from by the application controller 104 based on device information, such as a current location, or to be used sequentially (e.g., for different time periods). Upon configuring the data bearer 106, the application controller 104 may provide the packet 112 to the data bearer 106 for transmission.

In various embodiments, the application controller 104 may apply one or more user preferences in conjunction with the QoS rule 110. For example, the user preferences may specify a fast start to video calls, and that preference may be used to select a QoS in a QoS rule 110 or override the QoS in the QoS rule 110. To override the QoS specified by a QoS rule 110, a user of the telecommunication device 102 may be required to pay a fee or purchase a service plan upgrade.

In some embodiments, the application controller 104 may provide the telecommunication network 120 with a list of applications running on the telecommunication device 102. The telecommunication network 120 may utilize this information in configuring a QoS utilized by the telecommunication network 120 for the telecommunication device 102. The telecommunication network 120 may also utilize the list of applications in deciding whether to grant a request from a telecommunication device application for a specific QoS.

The telecommunication network 120 may be a telecommunication network of a telecommunication service provider that provides a plan or services to the telecommunication device 102. The telecommunication network 120 may include a core network and a plurality of access networks that are associated with base stations, nodeBs, eNodeBs, or other access points. The access networks of the telecommunication network 104 may each be associated with a specific geographic area (e.g., a cell, a macrocell, a microcell, a femtocell, etc.). In some embodiments, the telecommunication network 120 may be a cellular network having spectrum to allocate for cellular communications. As described above, such spectrum allocation may be responsive to a QoS specified by a QoS rule 110. For example, a base station may receive a request for certain resources (e.g., priority, minimum bit rate) from a telecommunication device 102 and may allocate resources, such as spectrum, or may prioritize packet flows based on the request.

In various embodiments, the application server(s) 122 and rule server(s) 124 may each be or include a server or server farm, multiple, distributed server farms, a mainframe, a work station, a personal computer (PC), a laptop computer, a tablet computer, an embedded system, or any other sort of device or devices. In one implementation, one or more of the application server(s) 122 and rule server(s) 124 represent a plurality of computing devices working in communication, such as a cloud computing network of nodes.

The application server(s) 122 may be associated with any sort of network application and may provide services to any number of remote clients, such as application 114. For example the application server(s) 122 may be video call server(s), voice call server(s), web server(s), social media server(s), messaging server(s), or media streaming server(s). The application server(s) 122 may receive packets 112 and may respond with packets that are received using the data bearer 106 configured with the QoS.

In some embodiments, the rule server(s) 124 may be devices of the network operator or service provider associated with the telecommunication network 120. As mentioned, the QoS rules 110 specified by the rule server(s) 124 may be specific to an application 114 or a category of applications 114. In addition, the rules may be specific to any one or more of a time period, a location, a telecommunication device 102, a subscription associated with the telecommunication device 102, a group of telecommunication devices, or a telecommunication service plan. The rule server(s) 124 may receive network information, such as congestion conditions at cells, from the telecommunication network 120. The rule server(s) 124 may also receive telecommunication device information from the telecommunication device 102 (e.g., from the application controller 104) or from the telecommunication network 120. The rule server(s) 124 may utilize the network information and telecommunication device information in formulating QoS rules 110 or updates to QoS rules 110. In some embodiments, specification or updating of QoS rules 110 may be triggered by the telecommunication network 120. As mentioned above, the QoS rules 110 may specify connection parameters, such as priority and minimum bit rate. They may also each be associated with an application identifier, either in the set of QoS rules 110 itself or in an accompanying table or structure. In embodiments where rules are associated with categories, the rule server(s) 124 may generate a further mapping of application identifiers to categories, and associate categories with QoS rules 110. The QoS rules 110 may be provided periodically or responsive to the generating or updating or QoS rules 110. In one embodiment, the QoS rules 110 are stored at the rule server(s) 124, and the application controller 104 may retrieve specific QoS rules 110 by providing an application identifier.

Example Telecommunication Device

FIG. 2 illustrates a component level view of a telecommunication device equipped with the application controller. As illustrated, the telecommunication device 102 comprises a system memory 202 storing the application controller 104, the radio interface layer 108, applications 114, the operating system 116, and other modules and data 204. Also, the telecommunication device 102 includes processor(s) 206, a removable storage 208, a non-removable storage 210, radio 212, output device(s) 214, and input device(s) 216.

In various embodiments, system memory 202 is volatile (such as RAM), non-volatile (such as ROM, flash memory, etc.) or some combination of the two. The application controller 104, the radio interface layer 108, applications 114, the operating system 116 are described above in detail with regard to FIG. 1. The other modules or data 204 stored in the system memory 202 may comprise any sort of applications or platform components of the telecommunication device 102, as well as data associated with such applications or platform components.

In some embodiments, the processor(s) 206 is a central processing unit (CPU), a graphics processing unit (GPU), or both CPU and GPU, or any other sort of processing unit.

Telecommunication device 102 also includes additional data storage devices (removable and/or non-removable) such as, for example, magnetic disks, optical disks, or tape. Such additional storage is illustrated in FIG. 2 by removable storage 208 and non-removable storage 210. Tangible computer-readable media may include volatile and nonvolatile, removable and non-removable media implemented in any method or technology for storage of information, such as computer readable instructions, data structures, program modules, or other data. System memory 202, removable storage 208 and non-removable storage 210 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the telecommunication device 102. Any such tangible computer-readable media may be part of the telecommunication device 102.

In some embodiments, the radio 212 includes any sort of radio known in the art, and may be associated with a wireless communication stack. For example, radio 212 may include a radio transceiver that performs the function of transmitting and receiving radio frequency communications via an antenna. The radio 212 may facilitate wireless connectivity between the telecommunication device 102 and various cell towers, base stations and/or access points of the telecommunication network 120. In addition to radio 212, the telecommunication device 102 may also include a wireless communication transceiver and a near field antenna for communicating over unlicensed wireless IP networks, such as local wireless data networks and personal area networks (e.g., Bluetooth or near field communication (NFC) networks).

In some embodiments, the output devices 214 include any sort of output devices known in the art, such as a display (e.g., a liquid crystal display), speakers, a vibrating mechanism, or a tactile feedback mechanism. Output devices 214 also include ports for one or more peripheral devices, such as headphones, peripheral speakers, or a peripheral display.

In various embodiments, input devices 216 include any sort of input devices known in the art. For example, input devices 216 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 3:
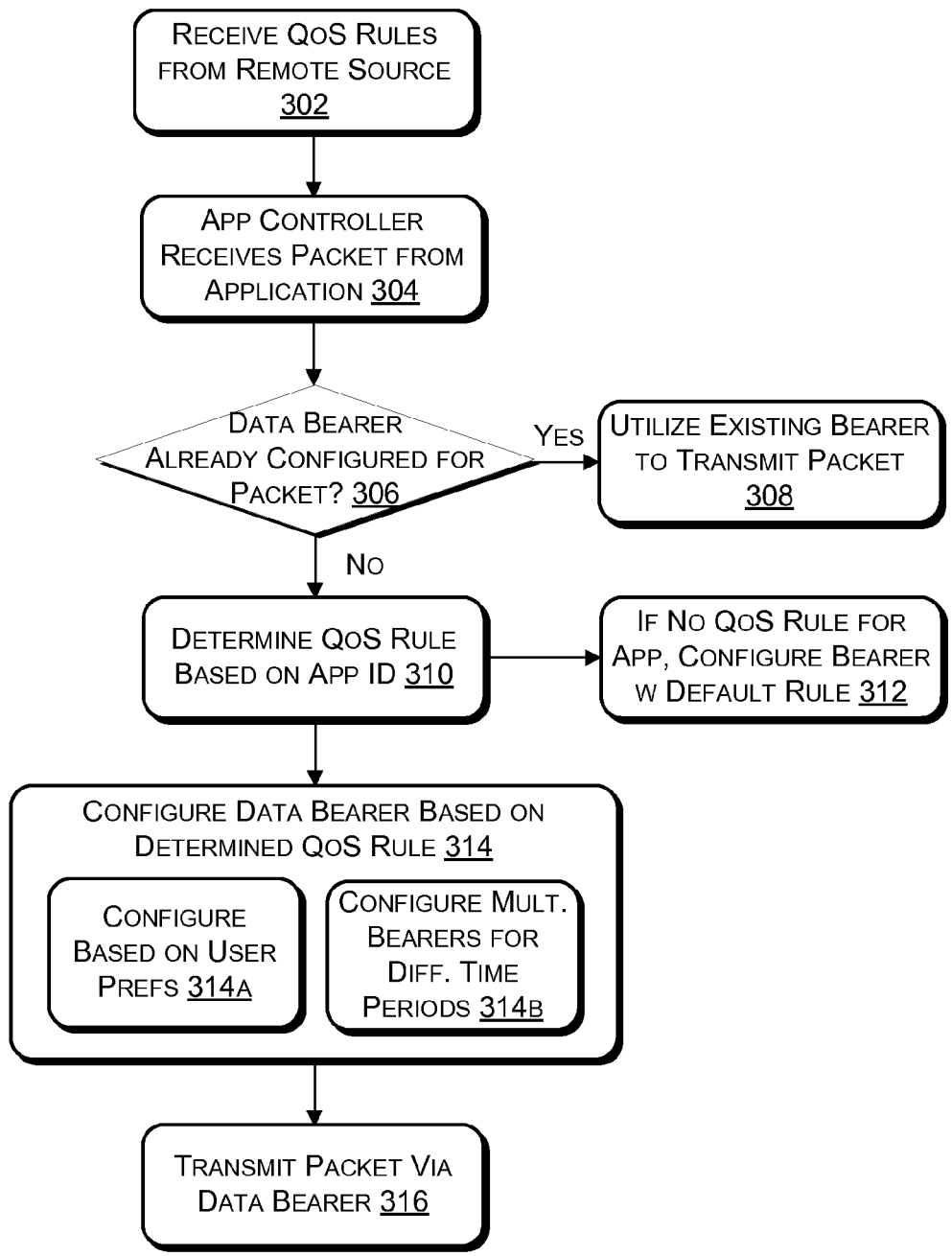
FIG. 3 illustrates an example process performed by application controller, the processing including determining a QoS rule for an application associated with a packet flow, configuring a data bearer with a QoS specified by the QoS rule, and providing a packet of the packet flow for transmission via the configured data bearer.

FIG. 3 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 illustrates an example process performed by application controller, the processing including determining a QoS rule for an application associated with a packet flow, configuring a data bearer with a QoS specified by the QoS rule, and providing a packet of the packet flow for transmission via the configured data bearer. The process includes, at 302, receiving or retrieving, by a telecommunication device, a set of QoS rules, or an update to a set of QoS rules, from a network operator or service provider.

At 304, an application controller of the telecommunication device receives a packet associated with a packet flow from an application of the telecommunication device. The application controller may be part of the application, part of an operating system of the telecommunication device, or a layer that is between the application and the operating system or between the operating system and a radio interface layer of the telecommunication device.

At 306, upon receiving the packet, the application controller determines whether a data bearer has already been configured for the packet flow associated with the packet. At 308, if a data bearer has already been configured, the application controller provides the packet to the data bearer for transmission.

At 310, in response to determining that a bearer has not been configured for the packet flow, the application controller determines for the packet flow a QoS rule associated with the application. The determining may comprise retrieving the QoS rule from the set of QoS rules based on an application identifier associated with the application. The application identifier may include one or more of an IP address, a communication protocol, a source port, a destination port, an application name, a signature, or a website name. The determined QoS rule may specify at least one of a priority or a minimum bit rate. Also, the QoS rule may specify different qualities-of-service for uplink and downlink communications of packets of the packet flow.

At 312, if the result of the determination is that there is no QoS rule for the application, the application controller utilizes a default QoS to configure a data bearer.

At 314, the application controller configures a data bearer for a wireless communication stack of the telecommunication device with a QoS specified by the QoS rule. At 314a, the configuring is further based at least in part on one or more user quality-of-service preferences. At 314b, the configuring comprises configuring the data bearer with a first quality-of-service for a time period and with a second quality-of-service at the expiration of the time period.

At 316, the telecommunication device transmits the packet via the configured data bearer, and in accordance with the QoS specified by the QoS rule, to a remote recipient.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A user equipment (UE) comprising:
a processor;
a wireless communication stack;
an application configured to be operated by the processor to send and receive packets of a packet flow;
an application controller configured to be operated by the processor to determine, for the packet flow, a quality-of-service rule associated with the application and to configure a data bearer for the packet flow with a first quality-of-service specified by the quality-of-service rule for a first cell in a telecommunications network and a second quality-of-service specified by the quality-of-service rule for a second cell in the telecommunications network using one or more radio interface layer (RIL) extensions to communicate with and configure the data bearer; and
a radio interface layer configured to be operated by the processor to implement the data bearer and to use the data bearer to transmit, via the wireless communication stack, a packet of the packet flow to a remote recipient;
wherein the second quality-of-service is further based at least in part on one or more user quality-of-service preferences provided by a user; and
wherein the one or more user quality-of-service preferences are used to (1) select a quality-of-service in a quality-of-service rule or (2) override the quality-of-service in the quality-of-service rule.

2. The UE of claim 1, wherein the application controller is part of the application, is part of an operating system, or is a layer that is between the application and the operating system or is between the operating system and the radio interface layer.

3. The UE of claim 1, further comprising a set of quality-of-service rules that is received from or updated by a network operator or a service provider, the set of quality-of-service rules including the quality-of-service rule.

4. The UE of claim 1, wherein the radio interface layer is further configured to utilize the data bearer for incoming packets from the remote recipient that are associated with the packet flow.

5. A method comprising:
   determining for a packet flow of an application, by a user equipment (UE), one or more quality-of-service rules associated with the application;
   configuring, by the UE, a data bearer for a wireless communication stack of the UE with a first quality-of-service for a time period and with a second quality-of-service at an expiration of the time period specified by the quality-of-service rule using one or more radio interface layer (RIL) extensions to communicate with and configure the data bearer;
   transmitting, by the UE, via the data bearer, a packet of the packet flow in accordance with the first quality-of-service or the second quality-of-service based at least in part on a current time;
   receiving another packet of another packet flow of another application, determining that the other application is not associated with a quality-of-service rule, and configuring another data bearer with a default quality-of-service;
   wherein the second quality-of-service is further based at least in part on one or more user quality-of-service preferences; and
   wherein the one or more user quality-of-service preferences are used to (1) select a quality-of-service in a quality-of-service rule or (2) override the quality-of-service in the quality-of-service rule.

6. The method of claim 5, further comprising receiving another packet of another packet flow from the application, determining that another data bearer has already been configured for the other packet flow, and providing other packet to the other data bearer for transmission.

7. The method of claim 5, wherein the determining and configuring are performed by a quality-of-service application controller of the UE.

8. The method of claim 5, wherein the determining comprises retrieving the quality-of-service rule from a set of quality-of-service rules based on an application identifier associated with the application.

9. The method of claim 8, further comprising receiving the set of quality-of-service rules or an update to the set of quality-of-service rules from a network operator or service provider.

10. The method of claim 8, wherein the application identifier includes one or more of an internet protocol (IP) address, a communication protocol, a source port, a destination port, an application name, a signature, or a website name.

11. The method of claim 5, wherein the quality-of-service rule specifies at least one of a priority or a minimum bit rate.

12. The method of claim 5, wherein the quality-of-service rule specifies different qualities-of-service for uplink and downlink communications of packets of the packet flow.

13. The method of claim 5, wherein the configuring is further based at least in part on one or more user quality-of-service preferences.

14. The method of claim 5, wherein the quality-of-service rule belongs to one of a plurality of sets of quality-of-service rules respectively associated with a plurality of subscription levels.

15. One or more computer storage devices having stored thereon computer-executable instructions configured to program a user equipment (UE) to perform operations comprising:
   determining for a packet flow of an application a first quality-of-service rule associated with the application;
   determining that a data bearer has not previously been configured for the packet flow;
   receiving one or more user quality-of-service preferences from a user at the UE to override the first quality-of-service rule;
   prompting the user to pay a fee to access a second quality-of-service;
   configuring a data bearer for a wireless communication stack of the UE with a second quality-of-service rule based at least in part on the one or more user quality-of-service preferences using one or more radio interface layer (RIL) extensions to communicate with and configure the data bearer; and
   transmitting, via the data bearer, a packet of the packet flow in accordance with the second quality-of-service rule;
   wherein the second quality-of-service is higher than the quality-of-service associated with the first quality-of-service rule.

16. The one or more computer storage devices of claim 15, wherein the determining comprises retrieving the first quality-of-service rule from a set of quality-of-service rules based at least in part on an application identifier associated with the application.

17. The one or more computer storage devices of claim 15, wherein the first quality-of-service rule specifies at least one of a priority or a minimum bit rate.

18. The one or more computer storage devices of claim 15, wherein the second quality-of-service is a default highest quality-of-service for a telecommunications network associated with the UE.

19. The UE of claim 1, where the user (1) pays a fee or (2) purchases a service plan upgrade to override the quality-of-service specified by the quality-of-service rule.

* * * * *